United States Patent
Yoshimura et al.

(10) Patent No.: US 9,796,271 B2
(45) Date of Patent: Oct. 24, 2017

(54) AIR-CONDITIONER POWER SUPPLY SYSTEM FOR MULTI-SYSTEM TRAIN CAR

(75) Inventors: Keiji Yoshimura, Tokyo (JP); Tatsuaki Umezaki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 648 days.

(21) Appl. No.: 14/111,011

(22) PCT Filed: May 29, 2012

(86) PCT No.: PCT/JP2012/003494
§ 371 (c)(1),
(2), (4) Date: Oct. 10, 2013

(87) PCT Pub. No.: WO2012/164907
PCT Pub. Date: Dec. 6, 2012

(65) Prior Publication Data
US 2014/0028091 A1    Jan. 30, 2014

(30) Foreign Application Priority Data
Jun. 3, 2011   (JP) .................................. 2011-125279

(51) Int. Cl.
*B60L 1/00* (2006.01)
*B60L 3/00* (2006.01)
(Continued)

(52) U.S. Cl.
CPC ................. *B60L 1/003* (2013.01); *B60L 1/06* (2013.01); *B60L 9/12* (2013.01); *B60L 9/18* (2013.01);
(Continued)

(58) Field of Classification Search
CPC . Y02T 10/7005; Y02T 90/14; Y02T 10/7072; Y02T 90/121; Y02T 90/127;
(Continued)

(56) References Cited

U.S. PATENT DOCUMENTS 4,795,859 A  *  1/1989  Kato .......................... B60L 1/04
                                                                191/11
5,521,788 A  *  5/1996  Miyazaki .................. B60L 1/00
                                                                307/82
(Continued)

FOREIGN PATENT DOCUMENTS

CN           1092027 A      9/1994
EP         0 594 457 A1     4/1994
(Continued)

OTHER PUBLICATIONS

The extended European Search Report issued on Aug. 18, 2015, by the European Patent Office in corresponding European Patent Application No. 12793265.5-1807 (11 pgs).
(Continued)

*Primary Examiner* — Jared Fureman
*Assistant Examiner* — Esayas Yeshaw
(74) *Attorney, Agent, or Firm* — Buchanan Ingersoll & Rooney PC

(57) ABSTRACT

There is provided an air-conditioning apparatus including an auxiliary power supply that, when a voltage from an overhead line extending over sections powered by different power sources is stepped down with a transformer, converts the voltage into a low-voltage DC voltage and that, when a voltage from the overhead line is a DC voltage, is directly fed with the voltage and converts it into the low-voltage DC voltage that is the same as the converted DC voltage, and further including an inverter device that converts the DC voltage from the auxiliary power supply into an AC voltage
(Continued)

and that supplies the AC voltage to a drive unit of a refrigeration cycle apparatus.

5 Claims, 2 Drawing Sheets

(51) Int. Cl.
*H02G 3/00* (2006.01)
*B60L 1/06* (2006.01)
*B60L 9/18* (2006.01)
*B60L 9/12* (2006.01)
*B60L 15/20* (2006.01)

(52) U.S. Cl.
CPC ........... *B60L 15/20* (2013.01); *B60L 2200/26* (2013.01); *B60L 2210/12* (2013.01); *B60L 2210/30* (2013.01); *B60L 2210/40* (2013.01); *B60L 2240/34* (2013.01); *B60L 2240/421* (2013.01); *B60L 2270/46* (2013.01); *Y02T 10/7233* (2013.01); *Y02T 10/7241* (2013.01); *Y02T 10/7275* (2013.01)

(58) Field of Classification Search
CPC ............... Y02T 90/122; Y02T 10/7077; Y02T 10/7241; Y02T 90/128; Y02T 90/163; Y02T 10/7044; Y02T 90/125; Y02T 90/16; Y02T 10/705
USPC .......................................................... 307/9.1
See application file for complete search history.

(56) References Cited

U.S. PATENT DOCUMENTS

| | | | |
|---|---|---|---|
| 5,886,889 A | 3/1999 | Escallier | |
| 6,239,999 B1* | 5/2001 | Mai | B60L 9/30 363/125 |
| 6,424,135 B1* | 7/2002 | Russo | B60L 9/30 323/360 |
| 7,301,293 B2* | 11/2007 | Toda | B60L 9/16 318/66 |
| 7,965,056 B2* | 6/2011 | Terunuma | B60L 7/16 318/800 |
| 2006/0208685 A1* | 9/2006 | Schnetzka | H02H 9/001 318/800 |
| 2007/0283713 A1* | 12/2007 | Masselus | B60L 1/003 62/331 |
| 2013/0016541 A1* | 1/2013 | Norrga | H02J 3/36 363/52 |

FOREIGN PATENT DOCUMENTS

| | | |
|---|---|---|
| JP | 61-193964 A | 8/1986 |
| JP | 64-12401 U | 1/1989 |
| JP | 2-65602 A | 3/1990 |
| JP | 5-10481 U | 2/1993 |
| JP | 6-141404 A | 5/1994 |
| JP | 6-245316 A | 9/1994 |
| JP | 7-7808 A | 1/1995 |
| JP | 2002-112405 A | 4/2002 |
| JP | 2002-218764 A | 8/2002 |
| JP | A-2010-200576 | 9/2010 |

OTHER PUBLICATIONS

Japanese Office Action dated Mar. 17, 2015 issued in corresponding Japanese Patent Appln. No. 2011-125279, with English translation (5 pages).
Chinese Office Action dated Mar. 31, 2015 issued in corresponding Chinese Patent Appln. No. 201280026855.0, with English translation (12 pages).
International Search Report (PCT/ISA/210) dated Jul. 31, 2012, by the Japanese Patent Office as the International Searching Authority for International Application No. PCT/JP2012/003494.
Office Action (Second) dated Nov. 23, 2015, by the Chinese Patent Office in corresponding Chinese Patent Application No. 201280026855.0 and an English translation thereof. (10 pgs).
Aug. 22, 2016 European Communication pursuant to Article 94(3) EPC issued by the European Patent Office in European Application No. 12 793 265.5. (9 pages).
May 30, 2017 Communication pursuant to Article 94(3) EPC issued by European Patent Office in European Application No. 12 793 265.5.

* cited by examiner

AIR-CONDITIONER POWER SUPPLY SYSTEM FOR MULTI-SYSTEM TRAIN CAR

TECHNICAL FIELD

The present invention relates to an air-conditioner power supply system for an air-conditioning apparatus that is mounted on a multi-system train car.

BACKGROUND ART

Conventionally, in order to address multiplication of power sources of overhead lines, auxiliary power supplies for train cars have been designed to supply a 400V class three-phase AC voltage as power to an air-conditioning apparatus. In one such power supply, in order to reduce weight and save space of the auxiliary power supply side, an isolation transformer of an output unit is omitted and non-isolated power is supplied. In this case, the power supplied from the auxiliary power supply has a waveform with a 600V class square wave as a peak value. Since the air-conditioning apparatus is equipped at a position apart from the auxiliary power supply, an equipment line for power provided from the auxiliary power supply to the air-conditioning apparatus has a length of 40 m or more in a long one; accordingly, it is known that a peak value of the waveform of the power supplied to the air-conditioning apparatus may become twice or more of the 600V class (peak value). This may accelerate dielectric breakdown of the winding of the electric motor used in the air-conditioning apparatus and may bring about an adverse effect on the life of the electric motor.

There is a known air-conditioner power supply system that accommodates to two power sources (AC power source/DC power source) by providing an AC power source input terminal and a DC power source input terminal on the input side of an inverter device built-in into the air-conditioning apparatus. In this case, when power supplied to the air-conditioning apparatus is an AC voltage, the power is supplied to the electric motor of the air-conditioning apparatus from the inverter device via a rectifier unit that is built-in in the air-conditioning apparatus. Furthermore, when the power is of a DC voltage, the power is supplied to the electric motor inside the air-conditioning apparatus from the inverter device; hence, there will be no case in which the peak value of the waveform of the power becomes twice or more of the 600V class (peak value), and the effect on the life of the winding of the electric motor becomes small (see Patent Literature 1, for example).

CITATION LIST

Patent Literature

Patent Literature 1: Japanese Examined Utility Model Application No. 5-10481 (p. 2, FIG. 1)

SUMMARY OF INVENTION

Technical Problem

In the above-described technique disclosed in Patent Literature 1, two systems of the equipment lines need to be equipped, that is, a system for an AC power source and a system for a DC power source; accordingly, there is a concern that the weight of the train car side is increased and adverse effects are caused.

The present invention is made to overcome the above problem and an object thereof is to provide an air-conditioner power supply system for a multi-system train car that is capable of suppressing increase in weight of a train car side even in a case of a multi-system train car by sharing an equipment line (single system), as well as providing an air-conditioning apparatus that can be accommodated to this, and further to provide an air-conditioner power supply system for a multi-system train car that is capable of reducing weight and saving space of an auxiliary power supply.

Solution to Problem

The air-conditioner power supply system for a multi-system train car of the invention includes an auxiliary power supply that, when a voltage from an overhead line extending over sections powered by different power sources is stepped down with a transformer, converts the voltage into a low-voltage DC voltage and that, when a voltage from the overhead line is a DC voltage, is directly fed with the voltage and converts it into the low-voltage DC voltage that is same as the converted DC voltage; and an air-conditioning apparatus having an inverter device that converts the DC voltage from the auxiliary power supply into an AC voltage and that supplies the AC voltage to a drive unit of a refrigeration cycle apparatus.

Advantageous Effects of Invention

According to the present invention, when a voltage from the overhead line extending over sections powered by different power sources is stepped down with the transformer, the auxiliary power supply converts the voltage into a low-voltage DC voltage, and when a voltage from the overhead line is a DC voltage, is directly fed with the voltage and converts it into the low-voltage DC voltage that is same as the converted DC voltage. Further, the inverter device of the air-conditioning apparatus converts this DC voltage into an AC voltage and supplies the AC voltage to the drive unit of the refrigeration cycle apparatus. Accordingly, there is no need for an inverter device in the auxiliary power supply, and, thus, contribution to reducing weight and saving space of the auxiliary power supply can be made. Furthermore, since the DC voltage that is output from the auxiliary power supply is of a single system, weight reduction of the train car, compared to conventional multiple systems, can be made owing to decrease in the equipment lines.

DESCRIPTION OF EMBODIMENTS

First Embodiment

Figure 1:
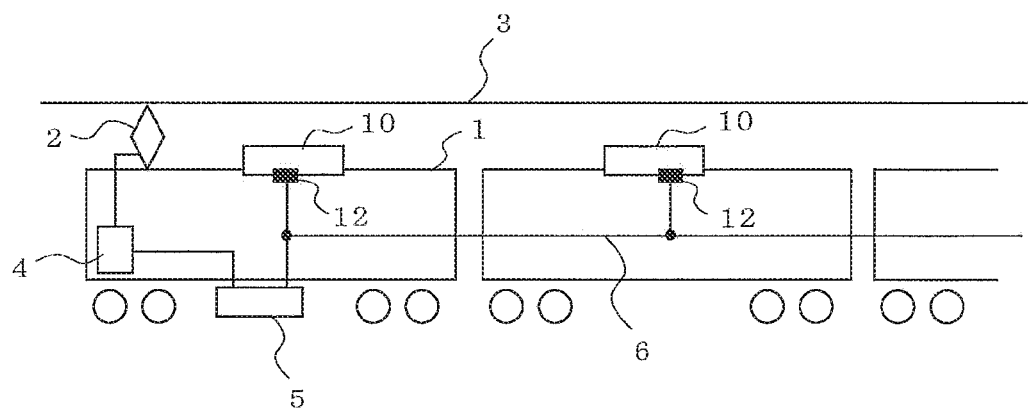
FIG. 1 is a block diagram illustrating an air-conditioner power supply system for a multi-system train car according to a first embodiment.

FIG. 1 is a block diagram illustrating an air-conditioner power supply system for a multi-system train car according to a first embodiment.

Referring to FIG. 1, an overhead line 3 that supplies power to a train car 1 through a pantograph 2 includes four power sources that extend over sections of 1500V, 3000V, 15000V, and 25000V, for example.

The air-conditioner power supply system of the train car 1 includes an auxiliary power supply 5 that, when the train car 1 is running under a DC voltage of 1500V or 3000V as its power, directly is fed with the DC voltage and converts it into a low-voltage DC voltage (a 600V class DC voltage, for example) and that, when the train car is running under an AC voltage of 15000V or 25000V as its power, converts the AC voltage that has been stepped down (an 800V class single-phase AC voltage, for example) with a transformer 4 into the same low-voltage DC voltage as the above DC voltage. The air-conditioner power supply system of the train car 1 further includes a plurality of air-conditioning apparatuses 10 each mounted on, for example, a roof of a train car 1 and that is connected to the auxiliary power supply 5 through an equipment line 6 of a single system.

The auxiliary power supply 5 includes a DC-DC converter that converts a DC voltage into a 600V class low voltage DC voltage when a DC voltage of 1500V or 3000V is input and includes an AC-DC converter that converts an AC voltage into a 600V class low voltage DC voltage when an 800V class single-phase AC voltage is input. The 600V class DC voltage that has been converted by the auxiliary power supply 5 is supplied to the air-conditioning apparatuses 10 through the equipment line 6 equipped in the train car 1. The equipment line 6 serves as a connecting wiring of each of the air-conditioning apparatuses 10.

Figure 2:
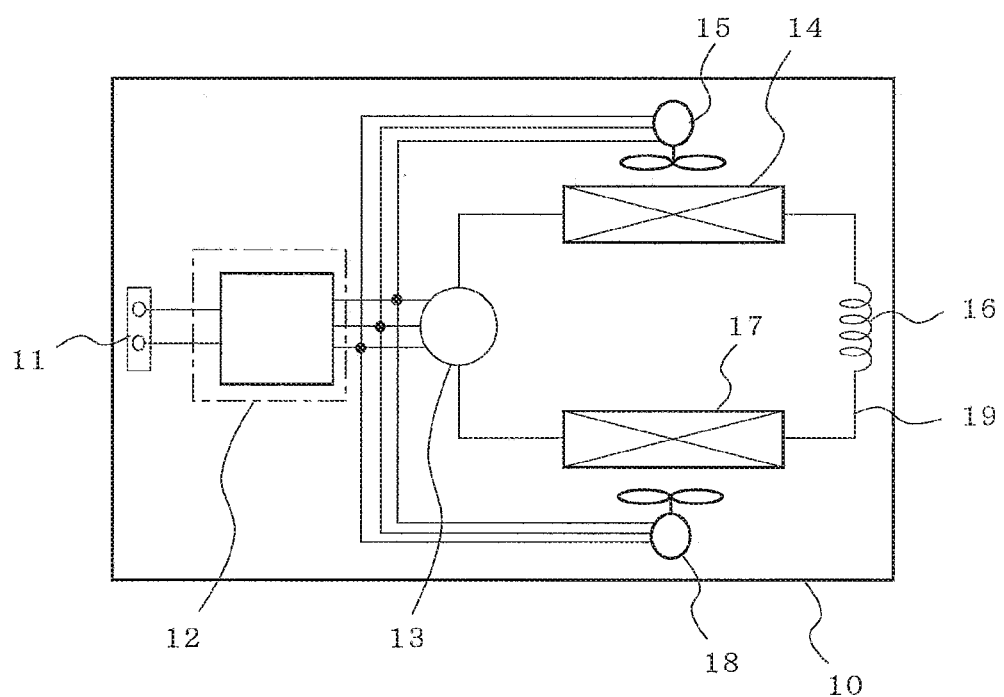
FIG. 2 is a schematic block diagram of an air-conditioning apparatus illustrated in FIG. 1.

FIG. 2 is a schematic block diagram of the air-conditioning apparatus illustrated in FIG. 1.

The air-conditioning apparatus 10 includes two input terminals 11 to which the equipment line 6 is connected, an inverter device 12, a refrigeration cycle apparatus, and the like. The refrigeration cycle apparatus is configured by sequentially connecting, with refrigerant pipes 19, for example, a compressor 13, a condensation heat exchanger 14 that includes a fan 15, a decompression device 16 that is constituted by a capillary tube, and an evaporation heat exchanger 17 that includes a fan 18. Note that the refrigeration cycle apparatus may be configured such that it can switch between a cooling operation and a heating operation. The above-described inverter device 12 converts a 600V class DC voltage into a predetermined three-phase AC voltage and supplies the three-phase AC voltage to electric motors each serving as a drive unit of the compressor 13, fans 15 and 18 of the refrigeration cycle apparatus.

In the air-conditioner power supply system configured as above, when the train car 1 is running, for example, in each of the sections of DC 1500V and 3000V, the auxiliary power supply 5 directly is fed with the DC voltage, converts the DC voltage into a 600V class low voltage DC voltage with the DC-DC converter, and supplies the DC voltage to the plurality of air-conditioning apparatuses 10 through the equipment line 6. Furthermore, when the train car 1 is running in an AC section of AC 15000V or 25000V from the DC section, the transformer 4 steps down the AC voltage to an 800V class single phase AC voltage and supplies it to the auxiliary power supply 5. At this time, the auxiliary power supply 5 converts the 800V class single phase AC voltage into a 600V class DC voltage with the AC-DC converter and supplies it to the plurality of air-conditioning apparatuses 10 through the equipment line 6. In this case, since the equipment line 6 delivers a DC voltage, the power supply voltage in the equipment line 6 does not experience any abnormal peak voltage.

Meanwhile, the inverter device 12 of each air-conditioning apparatus 10 converts a 600V class DC voltage, which is input through the two input terminals 11, into a predetermined AC voltage and supplies the AC voltage to each electric motor of the compressor 13 and fans 15 and 18 of the refrigeration cycle apparatus.

As the AC section, a section of 15000V and 25000V has been described; however, there are cases in which the AC section is low in frequency such as 12500V, 25 Hz. When the train car 1 is running in this AC section, the transformer 4 steps down the AC voltage to an 800V class single phase AC voltage, and the auxiliary power supply 5 converts the 800V class single phase AC voltage into a 600V class DC voltage and supplies it to the plurality of air-conditioning apparatuses 10 through the equipment line 6.

As described above, according to the first embodiment, even if the train car 1 is running through sections (AC section/DC section) powered by different power, a 600V class DC voltage is supplied to the air-conditioning apparatuses 10 from the auxiliary power supply 5 and the 600V class DC voltage is converted into a three-phase alternating current with the inverter device 12. Therefore, it is possible to suppress abnormal amplification of the peak value of the voltage generated in the three-phase power supply and, thus, it is possible to supply power that is unproblematic to the insulation of the electric motors of the air-conditioning apparatuses 10.

Furthermore, since a 600V class DC voltage is output from the auxiliary power supply 5 to the air-conditioning apparatuses 10, an inverter device is not required inside the auxiliary power supply 5 and contribution to size reduction and weight reduction can be made. Additionally, since the equipment line 6 is of a single system and is shared, contribution to weight reduction of the train car 1 can be made.

Furthermore, since the inverter device 12 accommodating to a 600V class DC voltage is included inside each of the air-conditioning apparatuses 10, it is possible to control the rotation speed of the compressor 13 and the electric motors of the fans 15 and 18 for the heat exchangers 14 and 17 inside each of the air-conditioning apparatuses 10, and, thus, it is possible to carry out energy-saving operations and to carry out minute temperature controls; accordingly, contribution to improving comfort in the train car 1 can be made. Regardless of the power state of the overhead line 3, including the state in which the overhead line 3 is in an AC section with low frequency of 12500V, 25 Hz, it is possible to increase the air-conditioning capacity by increasing the frequency of the electric motor to 60 Hz or higher; hence, contribution to reducing size and weight of the air-conditioning apparatus 10 can be made.

Second Embodiment

Figure 3:
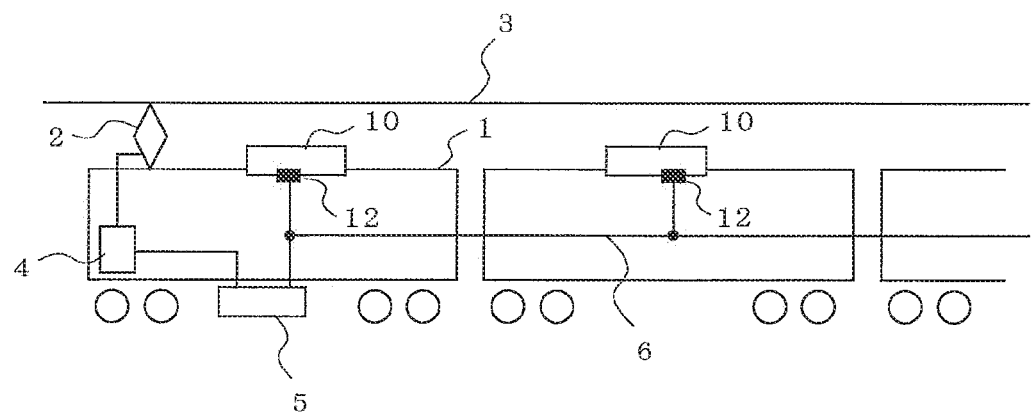
FIG. 3 is a block diagram illustrating an air-conditioner power supply system for a multi-system train car according to a second embodiment.

FIG. 3 is a block diagram illustrating an air-conditioner power supply system for a multi-system train car according to a second embodiment.

Referring to FIG. 3, an overhead line 3 that supplies power to a train car 1 through a pantograph 2 includes, similarly to the first embodiment, four power sources that extend over sections of 1500V, 3000V, 15000V, and 25000V.

The air-conditioner power supply system of the train car 1 includes an auxiliary power supply 5 that, when the train car 1 is running under a DC voltage of 1500V or 3000V as its power, is directly fed with the DC voltage and converts it into a low-voltage DC voltage (a 600V class DC voltage, for example) and that, when the train car is running under an AC voltage of 15000V or 25000V as its power, outputs the AC voltage that has been stepped down (a 400V class single-phase AC voltage, for example) with a transformer 4 when this AC voltage has been input. The air-conditioner power supply system of the train car 1 further includes a plurality of air-conditioning apparatuses 10 each mounted on, for example, a roof of a train car 1 and that is connected to the auxiliary power supply 5 through an equipment line 6.

The auxiliary power supply 5 includes a DC-DC converter that converts a DC voltage of 1500V or 3000V into a 600V class low voltage DC voltage when the DC voltage of 1500V or 3000V is input to the auxiliary power supply 5. Furthermore, as described above, the auxiliary power supply 5 outputs an AC voltage to the air-conditioning apparatuses 10 when a 400V class single-phase AC voltage is input to the auxiliary power supply 5. The 600V class DC voltage or the 400V class single-phase AC voltage that has been converted by the auxiliary power supply 5 is supplied to the air-conditioning apparatuses 10 through the equipment line 6 equipped in the train car 1. The equipment line 6 serves as a connecting wiring of each of the air-conditioning apparatuses 10.

Figure 4:
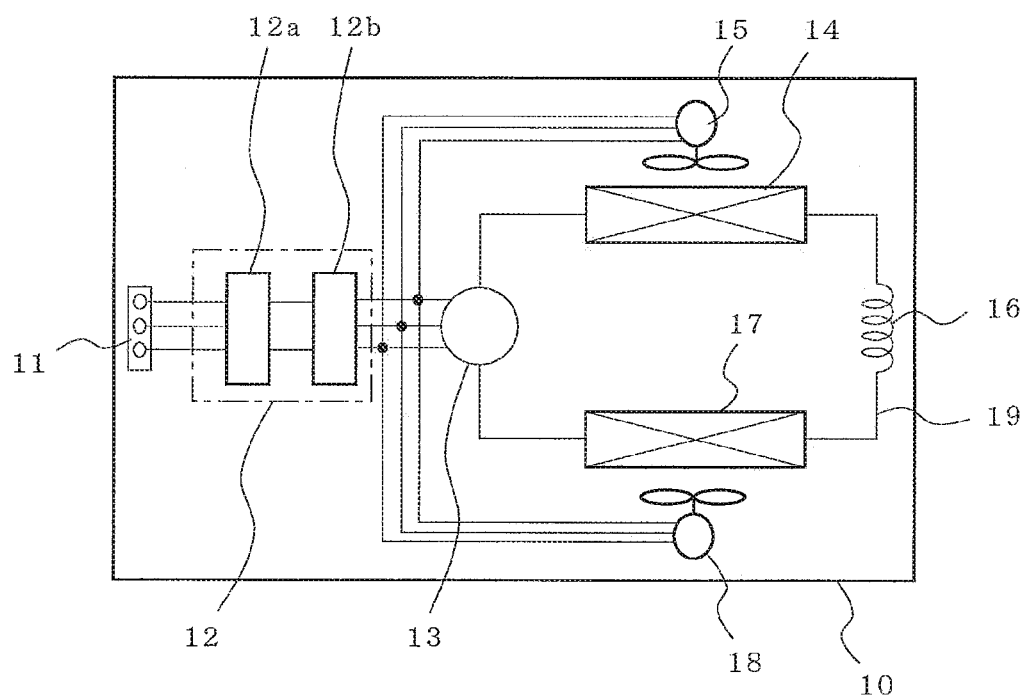
FIG. 4 is a schematic block diagram of an air-conditioning apparatus illustrated in FIG. 3.

FIG. 4 is a schematic block diagram of the air-conditioning apparatus illustrated in FIG. 3.

The air-conditioning apparatus 10 includes three input terminals 11 to which the equipment line 6 is connected, an inverter device 12, a refrigeration cycle apparatus, and the like. Similarly to the first embodiment, the refrigeration cycle apparatus is configured by sequentially connecting, with refrigerant pipes 19, a compressor 13, a condensation heat exchanger 14 that includes a fan 15, a decompression device 16 that is constituted by a capillary tube, an evaporation heat exchanger 17 that includes a fan 18, and the like. Note that a four-way valve may be provided on the discharge side of the compressor 13 such that the refrigeration cycle apparatus is one that can switch between a cooling operation and a heating operation.

The inverter device 12 described above includes a rectifier unit 12a and a frequency varying unit 12b. The rectifier unit 12a includes, for example, a three-phase full-wave rectifier circuit and a circuit that converts the output from the three-phase full-wave rectifier circuit into a predetermined DC voltage. For example, among the three input terminals 11, when a DC voltage is input to the terminals at both ends, the rectifier unit 12a converts the DC voltage into a predetermined DC voltage, and when a 400V class single-phase AC voltage is input to the same terminals, carries out full-wave rectification of the 400V class single-phase AC voltage and converts it into a predetermined DC voltage. Further, when a three-phase AC voltage is input to the three input terminals, the rectifier unit 12a carries out full-wave rectification of the three-phase AC voltage and converts it into a predetermined DC voltage. This three-phase AC voltage may be supplied from an external power supply other than the auxiliary power supply 5. This external power supply is, for example, a power supply used when a running test is carried out at a factory before mounting the air-conditioning apparatus 10 on the train car 1.

In the air-conditioner power supply system configured as above, when the train car 1 is running, for example, in each of the sections of 1500V and 3000V, the auxiliary power supply 5 is directly fed with the DC voltage, converts the DC voltage into a 600V class low voltage DC voltage with the DC-DC converter, and supplies the DC voltage to the plurality of air-conditioning apparatuses 10 through the equipment line 6. Furthermore, when the train car 1 is running in an AC section of 15000V or 25000V from the DC section, the transformer 4 steps down the AC voltage to a 400V class single phase AC voltage and supplies it to the auxiliary power supply 5. At this time, the auxiliary power supply 5 supplies the 400V class single phase AC voltage to the plurality of air-conditioning apparatuses 10 through the equipment line 6 without any change in the 400V class single phase AC voltage. In this case, since the equipment line 6 delivers either of the DC voltage and the AC voltage and does not deliver any square wave power supply voltage, the power supply voltage in the equipment line 6 does not experience any abnormal peak voltage.

Meanwhile, the rectifier unit 12a of each air-conditioning apparatus 10 further rectifies the DC voltage when, among the three input terminals 11, a DC voltage is input to the terminals at both ends and, further, converts this output into a predetermined DC voltage and outputs it to the frequency varying unit 12b. Additionally, when a 400V class single phase AC voltage is input to the same terminals, full-wave rectification is carried out and, further, the resultant voltage is converted into a predetermined DC voltage and is output to the frequency varying unit 12b. The above-described frequency varying unit 12b converts a DC voltage from the rectifier unit 12a into a three-phase AC voltage and supplies the three-phase AC voltage to the compressor 13 and fans 15 and 18, which are driving units of the refrigeration cycle apparatus.

Note that there may be an AC section, in which the frequency is low, of such as 12500V, 25 Hz of AC voltage, as in the first embodiment. When the train car 1 is running in this AC section, the transformer 4 steps down the AC voltage to a 400V class single phase AC voltage, and the auxiliary power supply 5 supplies the 400V class single phase AC voltage to the plurality of air-conditioning apparatuses 10 through the equipment line 6.

As above, according to the second embodiment, the auxiliary power supply 5 outputs a 600V class DC voltage when the train car 1 is running in a DC section, and directly outputs a 400V class single phase AC voltage that has been stepped down by the transformer 4 when the train car 1 is running in an AC section. As such, the inverter device inside the auxiliary power supply 5 is not required and the AC-DC converter that converts the single-phase power into a direct current is not required; hence, it is possible to further reduce size and weight of the auxiliary power supply 5.

Furthermore, since the rectifier unit 12a of the inverter device 12 that is built-in into the air-conditioning apparatus 10 can be accommodated to DC power, single-phase AC power, and three-phase AC power, only a single set of three input terminals 11 is required. Therefore, since the equipment line 6 is of a single system and can be shared, contribution to weight reduction of the train car 1 can be made.

Furthermore, since a three-phase full-wave rectifier circuit is provided in the rectifier unit 12a, there is an advantage such that a 400V three-phase AC voltage, for example, can be connected at a factory and a power supply during maintenance does not need to be prepared.

Furthermore, since the inverter device 12 is built-in inside each of the air-conditioning apparatuses 10, it is possible to control the rotation speed of the electric motors of compressor 13 and the fans 15 and 18 for the heat exchangers 14 and 17 inside each of the air-conditioning apparatuses 10, and, thus, it is possible to carry out energy-saving operations and to carry out minute temperature controls; accordingly, contribution to improving comfort in the train car 1 can be made. Regardless of the power state of the overhead line 3, including the state in which the overhead line 3 is in an AC section with low frequency of 12500V, 25 Hz of AC voltage, it is possible to increase the air-conditioning capacity by increasing the frequency of the electric motor to 60 Hz or higher; hence, contribution to reducing size and weight of the air-conditioning apparatus 10 can be made.

Note that in the second embodiment, three input terminals 11 are provided in each air-conditioning apparatus 10, and, further, a three-phase full-wave rectifier circuit is provided in each rectifier unit 12a such that a three-phase AC voltage from an external power supply can be rectified; however, the three-phase full-wave rectifier circuit may be replaced with a single-phase full-wave rectifier circuit. In such a case, although it is not possible to input a three-phase AC voltage from an external power supply, contribution to further size and weight reduction of the auxiliary power supply 5 and reduction of weight of the train car 1 owing to the equipment line 6 being of a single system can be made, as described above.

REFERENCE SIGNS LIST 1 train car; 2 pantograph; 3 overhead line; 4 transformer; 5 auxiliary power supply; 6 equipment line; 10 air-conditioning apparatus; 11 input terminal or three input terminals; 12 inverter device; 12a rectifier unit; 12b frequency varying unit; 13 compressor; 14 condensation heat exchanger; 15 fan; 16 decompression device; 17 evaporation heat exchanger; 18 fan; 19 refrigerant pipe.

The invention claimed is:

1. An air-conditioner power supply system for a multi-system train car, comprising:
    a transformer that, when a voltage from an overhead line extending over sections powered by different power sources is a high-voltage AC voltage, is configured to step down the high-voltage AC voltage into a low-voltage AC voltage,
    an auxiliary power supply device that, when the low-voltage AC voltage stepped down with the transformer is input, converts the low-voltage AC voltage into a low-voltage DC voltage and that, when a voltage from the overhead line is a DC voltage, is directly fed with the DC voltage and converts it into a low-voltage DC voltage that is same as the converted low-voltage DC voltage; and
    an air-conditioning apparatus including an inverter device that converts the DC voltage from the auxiliary power supply device into an AC voltage and that supplies the AC voltage to a drive unit of a refrigeration cycle apparatus.

2. The air-conditioner power supply system for a multi-system train car of claim 1, wherein the auxiliary power supply device and an air-conditioning apparatus that is close to the auxiliary power supply device among a plurality of the air-conditioning apparatuses, and, further, the air-conditioning apparatuses are connected through an equipment line of a single system, the equipment line being equipped in a train car.

3. An air-conditioner power supply system for a multi-system train car, comprising:
    a transformer that, when a voltage from an overhead line extending over sections powered by different power sources is a high-voltage AC voltage, is configured to step down the high-voltage AC voltage into a low-voltage AC voltage,
    an auxiliary power supply device that, when the low-voltage AC voltage stepped down with the transformer is input, outputs the low-voltage AC voltage and that, when a voltage from the overhead line is a high-voltage DC voltage, is directly fed with the high-voltage DC voltage from the overhead line and converts it into a low-voltage DC voltage; and
    an air-conditioning apparatus including
        a rectifier unit that, when the low-voltage DC voltage is input from the auxiliary power supply device, converts the DC voltage into a predetermined DC voltage and that, when the AC voltage is input from the auxiliary power supply device, converts the AC voltage into the predetermined DC voltage same as the converted DC voltage, and
        a frequency varying unit that converts the predetermined DC voltage from the rectifier unit into an AC voltage and that supplies the AC voltage to a drive unit of a refrigeration cycle apparatus.

4. The air-conditioner power supply system for a multi-system train car of claim 3, wherein when a three-phase AC voltage from an external power supply other than the auxiliary power supply device is input to the rectifier unit, the rectifier unit converts the three-phase AC voltage into a predetermined DC voltage and supplies the predetermined DC voltage to the frequency varying unit.

5. The air-conditioner power supply system for a multi-system train car of claim 3, wherein the auxiliary power supply device and an air-conditioning apparatus that is close to the auxiliary power supply device among a plurality of the air-conditioning apparatuses, and, further, the air-conditioning apparatuses are connected through an equipment line of a single system, the equipment line being equipped in a train car.

* * * * *